United States Patent [19]

Drago

[11] Patent Number: 5,183,237
[45] Date of Patent: Feb. 2, 1993

[54] METHOD FOR FISHING LINES IN SERIAL CONDUITS

[75] Inventor: Ronald P. Drago, Easton, Pa.

[73] Assignee: Spectrum Innovations, Inc., Flemington, N.J.

[21] Appl. No.: 813,894

[22] Filed: Dec. 23, 1991

[51] Int. Cl.⁵ .................................................. B65H 59/00
[52] U.S. Cl. ............................................................. 254/134.4
[58] Field of Search ............... 254/134.3 FT, 134.3 R, 254/134.4

[56] References Cited

U.S. PATENT DOCUMENTS

| | | |
|---|---|---|
| D. 318,784 | 8/1991 | Tamm . |
| 2,258,745 | 10/1941 | Dewey et al. ............. 254/134.3 R |
| 2,321,415 | 6/1943 | Peltz et al. ................ 254/134.3 R |
| 2,515,953 | 7/1950 | Dufresne . |
| 2,591,550 | 4/1952 | Kane ........................ 254/134.3 R |
| 3,038,702 | 6/1962 | Trunnell ................... 259/134.3 FT |
| 3,052,450 | 9/1962 | Trunnell ................... 254/134.3 FT |
| 3,160,394 | 12/1964 | Hunter et al. ............. 254/134.3 R |
| 3,301,531 | 1/1967 | Corsiglia . |
| 3,689,031 | 9/1972 | Ruddick et al. . |
| 4,030,702 | 6/1977 | Ware et al. . |
| 4,132,665 | 1/1979 | Nelson ....................... 254/134.3 R |
| 4,134,574 | 1/1979 | Jean et al. ................. 254/134.3 R |
| 4,382,581 | 5/1983 | Wimer et al. ............. 254/134.3 FT |
| 4,412,672 | 11/1983 | Zelins ....................... 254/134.3 R |
| 4,498,659 | 2/1985 | Brockelsby . |
| 4,596,381 | 6/1986 | Hamrick . |
| 4,756,510 | 7/1988 | Klamm et al. . |
| 4,822,005 | 4/1989 | Aleshire .................... 254/134.4 |
| 4,840,352 | 6/1989 | Ellis . |
| 4,909,481 | 3/1990 | Tamm . |
| 5,029,817 | 7/1991 | Tamm . |

FOREIGN PATENT DOCUMENTS 619991  8/1978  U.S.S.R. .................... 254/134.3 FT

Primary Examiner—Robert C. Watson
Attorney, Agent, or Firm—Eckert Seamans Cherin & Mellott

[57] ABSTRACT

For fishing lines through a number of conduits connecting one or more junction boxes or terminal devices, a bridging section temporarily couples incoming and outgoing conduits through the junction box or device. The bridging section has an internal contour leading smoothly from one conduit end to the other, the conduit ends typically protruding into the junction box such that the bridging section can enclose over the outside of the protruding portions of the conduit ends. The bridging section can have two sections divided longitudinally, coupled at a hinge axis and spring biased to engage against one another. Preferably the closed bridging section is substantially airtight and continues an airtight path through the two conduits, whereby the lines can be fished by pneumatically blowing a plug connected to a string through the path for the lines. The string is attached to the lines, which are pulled back through the conduits. For effecting connections the user removes the bridging section and pulls down sufficient slack in the lines for making desired connections. The invention reduces the number of times the user needs to visit each successive junction box along a cable route and thus reduces the cost of installing cables and other lines.

7 Claims, 4 Drawing Sheets

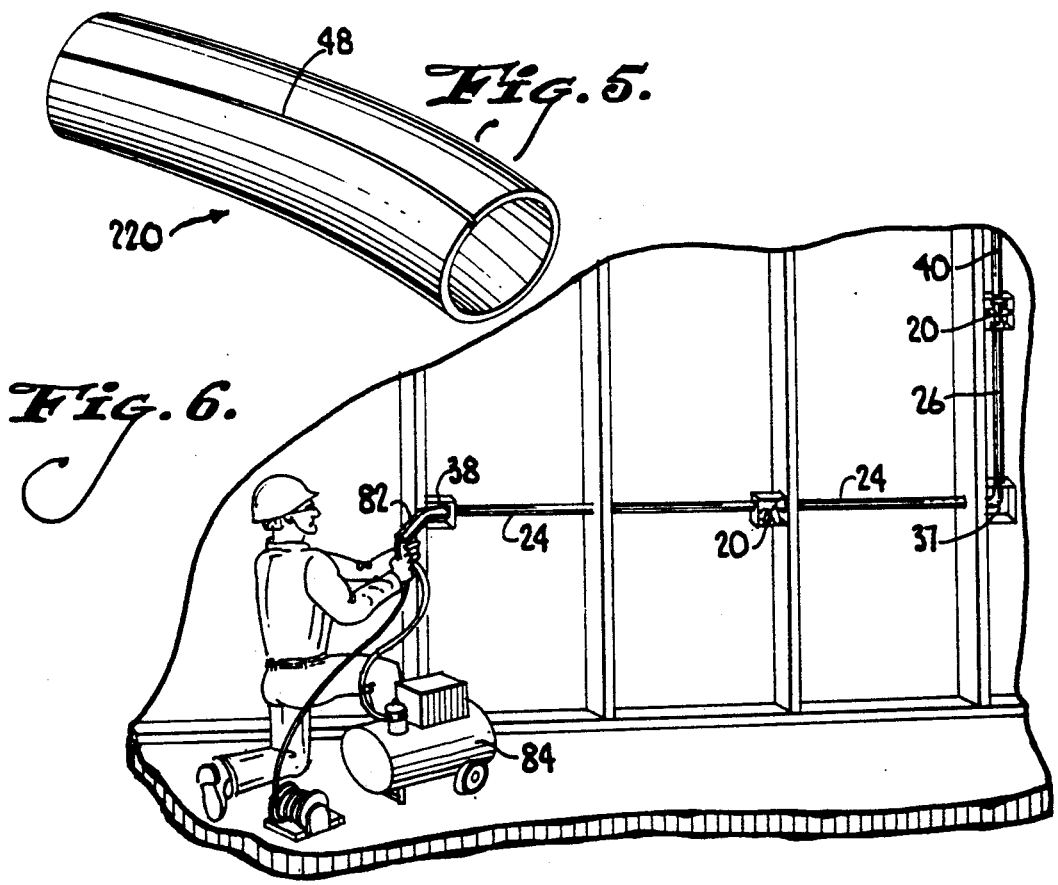
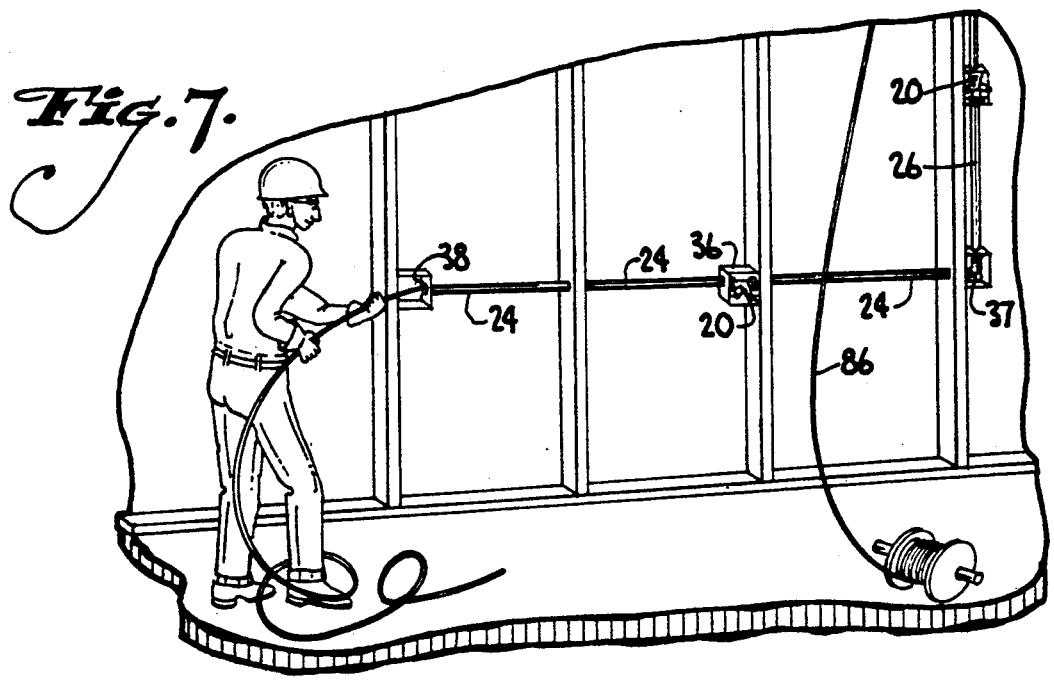

METHOD FOR FISHING LINES IN SERIAL CONDUITS

BACKGROUND OF THE INVENTION

1. Field of the Invention

This invention relates to the field of devices and methods to assist in running or "fishing" a line through a conduit, for example for pulling a cable through an electrical conduit. A pneumatic plug attached to a light line is forced through the conduit and then the line is used to pull through the cable or the like. The invention provides a connector means for removably bridging across the ends of two conduits which terminate at a junction box, such that the plug can be guided serially through two or more conduit sections, instead of fishing through the sections one at a time.

2. Prior Art

In running electrical cabling such as power lines, signal lines, fiber optic cable, etc., a network of hollow conduit sections is mounted to structural members of a building or the like, and the cabling is then pulled into the conduit. The path of particular lines running between terminal points is interrupted by junction boxes at which intermediate connections can be made. After installing the empty conduit along one or more sections, the installer typically pushes a length of material known as a "fish" through a section of uninterrupted conduit from one terminus to the next, the fish being relatively more rigid than the cable so that the fish can be pushed along readily and caused to pass through changes in direction and similar obstructions. The cable is typically more flexible than the fish, and would bend over at obstructions, while the fish does not. The installer attaches an end of the cable to the emerging end of the fish, and then pulls the cable through the conduit back to the insertion end, the cable being fed for example from a spool.

In lieu of a relatively rigid fish, it is known to provide an air blower for forcing through the conduit a plug attached to a string. Means are needed at the blower end of the conduit to pump air into the conduit while allowing the string to pay out as the plug advances with the flow of air. When the plug emerges, the installer affixes an end of the cable to the string and pulls the cable back to the insertion end of the conduit in the same manner as with a fish. Some examples of variations in the nature and use of pneumatic devices for this purpose are disclosed in the following patents, the disclosures of which are hereby incorporated:

U.S. Pat. No. 2,515,953 - Dufresne
U.S. Pat. No. 3,301,531 - Corsiglia
U.S. Pat. No. 3,689,031 - Ruddick et al
U.S. Pat. No. 4,030,702 - Ware et al
U.S. Pat. No. 4,498,659 - Brockelsby, III
U.S. Pat. No. 4,596,381 - Hamrick
U.S. Pat. No. 4,756,510 - Klamm et al
U.S. Pat. No. 4,840,352 - Ellis Whereas the air blower provides a pressure differential and flow of air through the conduit, the plug is pushed along from the higher pressure blower end of the conduit to a lower pressure emerging end. The process can be expedited by placing a suction device at the emerging end, provided the plug is caught when it emerges. Devices of this kind can quickly string a line through quite a long conduit.

In the case of conduits which define angular variations, such as right angle bends, the pneumatic plug can still pass readily. In pulling a relatively stiff cable back through the conduit, however, it is still difficult at times to draw the end of the cable through such bends. This problem is compounded where two or more bends are involved because of frictional engagement between the cable and the conduit walls at each bend. U.S. Pat. Nos. 4,909,481, 5,029,817 and Des. 318,784, all to Tamm, disclose devices with pulleys intended to assist the passage of a cable around a right angle bend. These devices are not suitable for uninterrupted conduits because they are intended for installation at an openable elbow structure similar to a junction box. These pulley devices are unsuitable for use with a pneumatic plug because they preclude a smooth path for guiding the plug through the elbow, and also open the conduit for escape of air.

A conventional conduit system includes uninterrupted sections of conduit, having smooth inside walls, running between junction boxes having a substantially larger inside area. Although the terminal points of each section are described herein as junction boxes, they could also involve other structures where access to the cable is needed, for example for making terminations, or for installing a supplemental apparatus as in Tamm. The ends of each uninterrupted length of conduit therefore may be coupled to junction boxes, to electrical devices or fittings, or to successive lengths of conduit, "uninterrupted" referring generally to routes of substantially constant inside diameter for passing a pneumatic plug, between two points having a larger inside dimension such as junction boxes, at which the cable can be terminated, coupled to branching cables, etc.

To fish or blow the cable, the installer requires access to both ends of a particular length of conduit. In many applications, the route of a cable will pass through a plurality of junction boxes, electrical devices, branches and the like; however, each of the junction boxes defines a discontinuity. Due to the increase in internal dimensions at the junction box, it is not possible to blow the pneumatic plug through the junction box. In a factory application, for example, the route of a power cable may extend along the ceiling, from end to end of a large building, with a plurality of junction boxes located along the route at regular spacing. At each of the junction boxes, connections are made to conduits with cables leading outwardly or downwardly, to outlets or to fixtures such as light fixtures. This is of course only one example of the many layouts which might be used. The example illustrates a shortcoming with respect to known conduit and cable installation techniques. The installer must repeatedly visit each of the junction box locations in order to complete the installation of the conduit and cable connections at the junction box. Typically the installer repeatedly climbs a ladder, performs a step of the process at one junction box location, moves on to the next location, returns to the previous location, and so on. It will be appreciated that a lot of time is spent in moving and climbing upon the ladder. Similar problems, although possibly less severe, characterize running a cable conduit along a wall, in a floor, etc., due to the need to perform successive operations at each box location.

The successive operations typically include attaching each of the boxes along the route to a secure structure, before or after cutting, bending, attaching together or otherwise forming a length of conduit tubing which reaches to the next or previous box remote from a given location; coupling the conduit at both ends via fittings;

fishing or blowing a line from that location to the remote location; attaching a cable to the line at the remote location; pulling the cable into the conduit at the given location; and returning after all the cables to the given box have been run, in order to make the electrical connections. Whereas each box must be visited repeatedly, a great deal of time and effort are required in moving about and climbing the ladder, in addition to the work of actually pulling cables and making connections.

It would be advantageous to arrange a technique for installing conduit and pulling cables which somehow minimizes the need to repeatedly visit individual junction boxes or the like along the route of a cable. However, a means to cut down on accesses is not readily apparent. The conduit-to-junction box connections must be made before the cable can be run. The junction boxes must be visited individually thereafter so that the ends of the conduit lengths which terminate there can be accessed. Two accesses are needed, one for inserting or capturing a fish or plug line which is fed through the respective conduit passage, and a second for attaching or receiving a cable end when the fish or plug line is withdrawn. For these and other reasons here has been no ready solution to the problem to date.

SUMMARY OF THE INVENTION

It is an object of the invention to minimize the need to visit individual junction boxes or other devices which are traversed by a cable route or which terminates a cable route.

It is another object of the invention to provide a means by which a cable can be fished all at once through an entire conduit route having one or more intermediate discontinuities such as junction boxes, without attentino to servicing the ends of conduit lengths or passages which terminate at the junction boxes.

It is a further object of the invention to render a cable route temporarily continuous, extending the passage defined by lengths of conduit to traverse discontinuities such as one or more junction boxes between conduit sections adjacent the discontinuities.

These and other objects are accomplished in a method and apparatus for fishing lines through serial hollow conduits having ends meeting at a discontinuity, for example due to internal dimensions of a junction box between the conduits being larger than that of the conduits. The method includes attaching to respective ends of the conduits one or more bridging sections, each having an internal contour leading smoothly from one conduit end to the other conduit end to define a route passing serially through the conduits and through the bridging section therebetween. The bridging section temporarily traverses the discontinuity and includes means such as a longitudinal seam which is openable along a full length of the bridging section for removing the bridging section after fishing, leaving the fished lines in place and accessible.

A semirigid fish can be passed along the route, its leading end being guided through the discontinuities by the bridging section, whereupon the fish is attached to a cable at its end and the cable is pulled through the route using the line. Preferably, the bridging section is substantially airtight, and connection of a series of bridging sections across discontinuities renders the serial path of the cable airtight between its ends. In that case the fishing can involve pneumatically blowing a plug attached to the line through the route and the bridging section(s).

The invention is applicable to routing electrical cables through conduits terminating in junction boxes, the bridging section continuing the internal dimension of the conduits through the larger dimension of the junction box such that the leading end of the fish (e.g., a blown plug) is guided from the terminus of one conduit to the inlet of another. The bridging section has at least one integral element defining an intermediate part having an internal dimension substantially equal to an internal dimension of one of the conduits. Means are provided for removably engaging the bridging section to the conduit ends, thereby providing a path of continuous internal dimensions through the conduits and the bridging section or bridge. The bridge can have, for example, a pair of sections of a tube, divided along an axial midplane and spring biased to pivot closed. The bridge is openable along its full length, whereby the bridge can define a path for a line through the conduit, and then when opened can be removed from the conduit ends, leaving the line in place.

With conventional electrical conduit the conduit ends protrude slightly into the junction box, for example being held in place by nuts which thread over the conduit ends. The bridging section in that case can grasp around the protrusions via enlarged diameter ends having an internal dimension sufficient to grasp around at least one of the two conduit ends and guiding the fish between the conduit ends. The internal dimension of an intermediate section between the enlarged diameter ends is preferably substantially coextensive with the internal dimension of the conduit when attached.

The bridging section can be arranged like a clothespin, with two sections pivotally attached together, and having a spring for resiliently urging the two sections together, the two sections each defining a longitudinal section of a tube. Finger tabs extending from the two sections allow the sections to be pivoted open against spring bias, for removing the bridge and accessing the cables.

Pulling a cable using the bridge and fishing arrangements disclosed, results in a cable which is arranged to pass through each discontinuity (e.g., junction box) without any slack, and there is a need for additional slack in the cable to provide cable end lengths which can be used to make connections, for example to other cables, to terminal strips or the like. According to the invention, after pulling the cable from a source such as a spool of cable located at one end of the cable run, the installer proceeds to the opposite end of the cable run to begin making terminations. After pulling sufficient cable from the source and terminating the extreme end, the installer proceeds to the next adjacent junction box on the route leading back to the cable source. At this next junction box slack for any necessary terminations is pulled from the source end of the cable, and so on from box to box leading back to the source. Therefore, sufficient slack for terminations is provided to the same extent as would be available if the cable had been fished and pulled from end to end of each separate conduit section.

The invention can be applied to complex routes of multiple cables which are diverted at particular junction boxes or which crisscross one another. In the event crossing paths occur in the same junction box the bridging sections can be made U-shaped so as to fit across crossing paths when installed at the same time. Alternatively, the lines for one path can be fished and pulled first, and after removing and repositioning the bridging section the crossing path can be fished and pulled second. Additional variations will be apparent in view of the following discussion of exemplary embodiments and practical examples.

BRIEF DESCRIPTION OF THE DRAWINGS

There are shown in the drawings certain examples of the invention as presently preferred. It should be understood that the invention is not limited to the precise arrangements and instrumentalities characterizing the preferred embodiments, and is subject to variations in accordance with the invention as defined in the claims. In the drawings.

FIG. 5 is a perspective view of an alternative embodiment of the bridging section according to the invention.

FIG. 6 is a perspective view illustrating pneumatically running a line or fish along a conduit path.

FIG. 7 is a perspective view showing pulling a cable subsequent to running the line.

DETAILED DESCRIPTION OF THE PREFERRED EMBODIMENTS

Figure 1:
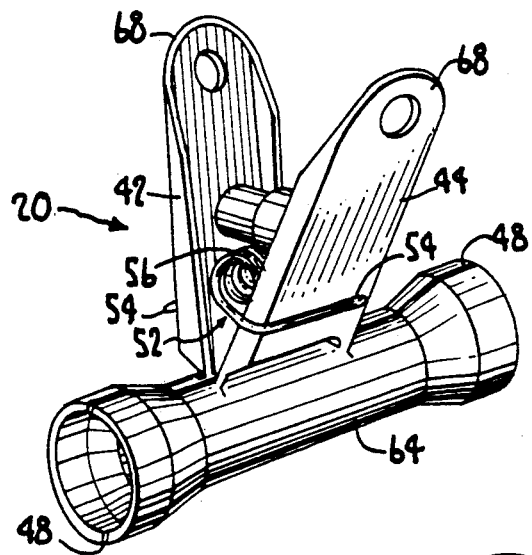
FIG. 1 is a perspective view of a bridging section according to the invention.
Figure 2:
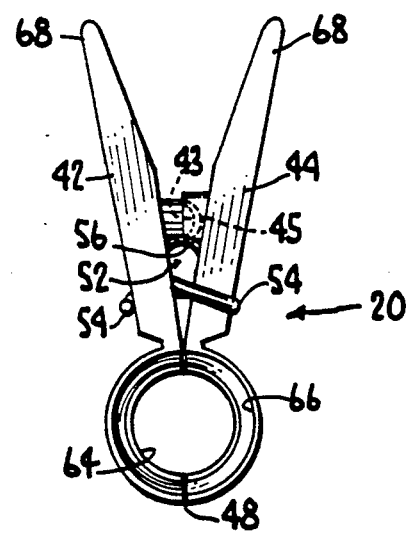
FIG. 2 is an end view of the bridging section shown in FIG. 1.
Figure 3:
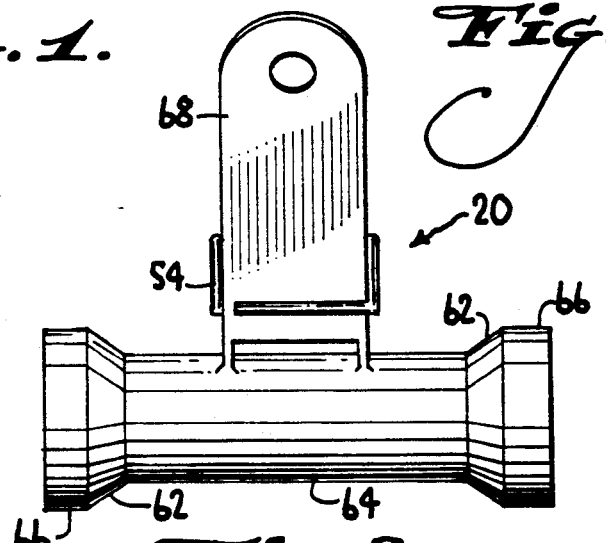
FIG. 3 is an elevation view of the bridging section according to FIG. 1.
Figure 4:
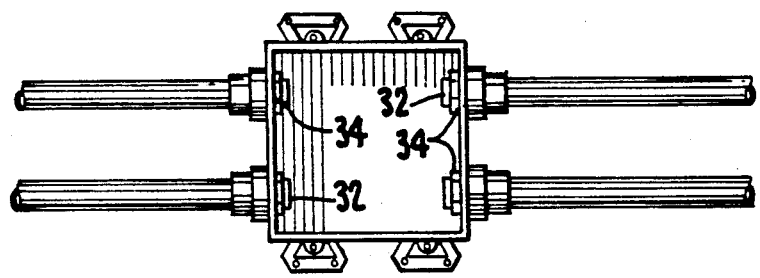
FIG. 4 is a partial elevation view of an open junction box along a route of cables to be passed therethrough.

FIGS. 1-3 illustrate a preferred bridging section 20 according to the invention, for removable attachment to ends 32 or conduit sections 24 at a junction box 36 or the like, shown generally (and empty) in FIG. 4. Bridging section 20 is installed temporarily before fishing a line and/or pulling cable through a route traversing two conduit sections ending at the junction box 36, the route thus traversing the junction box. The conduit sections 24 are internally smooth, and by addition of bridging section 20 the user provides a continuous path through the junction box 36 for passage of a fishing device such as a semirigid wire or a pneumatic plug affixed to a string.

Bridging section 20 as shown in FIGS. 1-3 has a pair of preferably integral clip elements 42, 44 which are pivotally connected at a fulcrum 46. The clip elements 42, 44, for example of injection molded plastic, define mating sections of a length of tube and are urged together by action of a spring 52 so as to meet along at least one line 48. The spring 52 can be arranged on clip elements 42, 44 in a manner similar to that of a spring biased clothespin. The spring 52 has a coil 56 with opposite ends 54 which bear inwardly on the clip elements 42, 44 at a point spaced from the fulcrum 46 on the side of the fulcrum opposite from two protruding finger tabs 68. The spring maintains the partial tube sections in contact at line 48, to define a closed tube with open opposite ends which can be clipped over the ends 32 of two conduits coupled to junction box 36. The finger tabs 68 allow the tube sections to be separated at line 48 against pressure of the spring 52, whereby the bridging section 20 can be opened and removed from the junction box 36 after a fishing line or a cable has been pushed or pulled along a route through the bridging section 20 and therefore through the junction box 36.

The inner contour of the bridge section 20 is arranged to continue smoothly the internal contour of the conduit sections 24 through the junction box 36 from one conduit to the next, such that the leading end of a fish, or the pneumatic plug attached to a fishing line, encounters a minimum of discontinuity in passing through the junction box 36. Without guidance from the emerging end of one conduit to the insertion end of the next conduit the end of the fish would very likely encounter an inner wall of the junction box 36 rather than the insertion end of the next conduit.

The bridge 20 also preferably seals the two conduit sections against the escape of air, thereby having the ability to guide a pneumatic plug from conduit to conduit. It is possible that if a junction box along an airtight path were sealed that some forms of pneumatic plug (e.g., a parachute) could find the insertion end due to airflow directed thereto. This would require resealing the junction box after installing it. Moreover, even if sealed, without the bridging section it is just as likely that a pneumatic plug will become stuck in the junction box and allow airflow to pass without advancing the plug.

The invention preferably guides either a semirigid fish or a pneumatic plug through the relatively enlarged opening defined by the junction box. For this purpose the bridge 20, and in particular the mating portions 42, 44, defines a stepwise change in internal diameter 62 adjacent the ends. The change in diameter 62 is such that along the central area of the tube formed by the bridge 20 intermediate the ends, the intermediate section's internal diameter 64 is substantially the same as the internal diameter of two conduits 24 to be bridged. At the ends of the bridge 20 the mating portions 42, 44 define enlarged internal diameters 64, substantially equal to the external diameter of the conduit sections 24, or equal to that of the fittings for the ends of conduit sections 24, which protrude into the junction box 36. As shown in FIG. 4, the conduit sections are typically provided with end fittings 34 for attaching the conduit sections rigidly to the junction box. The fittings 34 may include flanged collars that slide over the conduit ends outside' the junction box 36, for example being affixed to the conduits by set screws. Inside the junction box the fittings 34 have nuts which thread over the collars, clamping the conduit wall between the internal nut and the external flange, and fixing the conduit in place. Typically, it is the threaded portion of the collar (extending into the junction box 36 beyond the nut) which defines the external diameter of the conduit section protruding into the junction box. It is also possible to have the conduit itself protrude by a short distance into the junction box, using a different form of fitting. The internal diameter of the enlarged bridge section opening 6 is made equal to the external diameter of whatever form of protruding structure which may be present.

Figure 9:
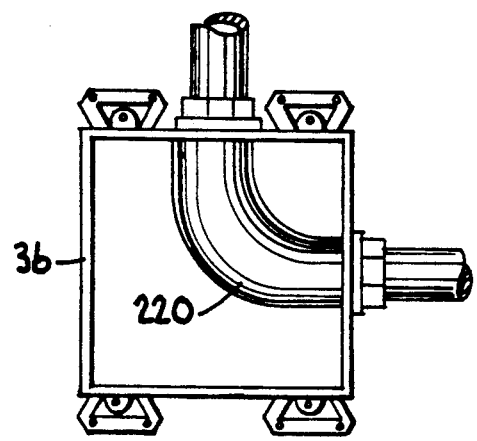
FIG. 9 is an elevation view of a junction box with the bridging section according to FIG. 5, illustrating routing a line around an angular path in the box.
Figure 10:
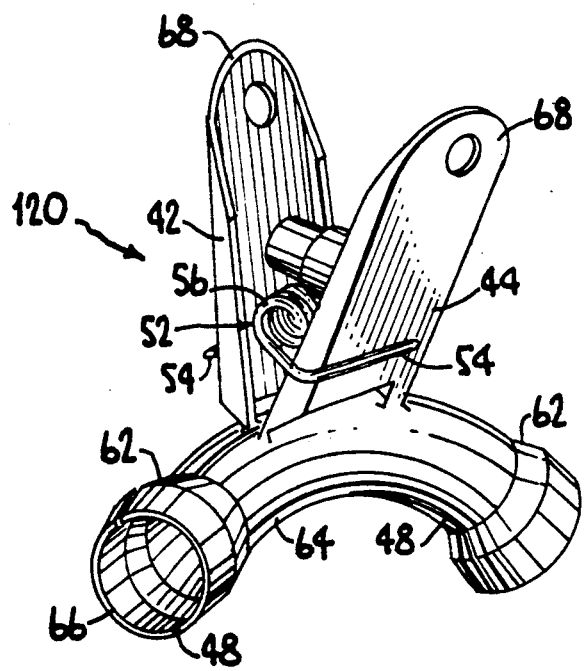
FIG. 10 is a perspective view of an alternative embodiment of a spring biased bridging section, arranged to route a line around a right angle.
Figure 11:
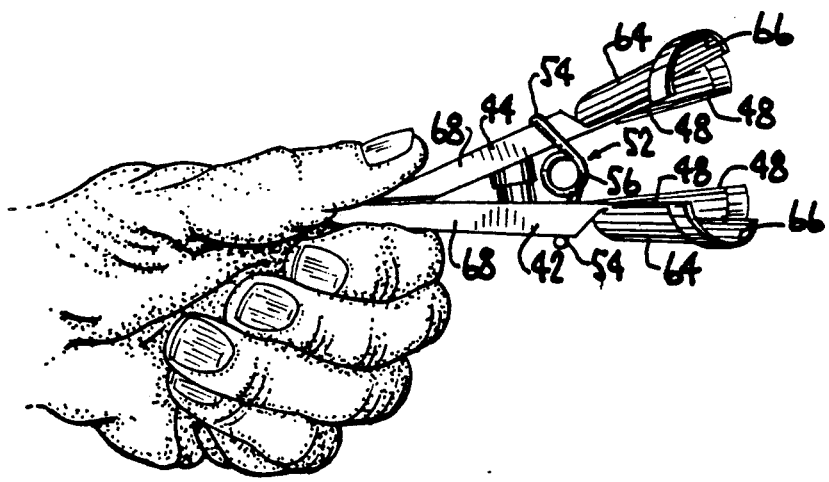
FIG. 11 is an elevation view of the embodiment according to FIG. 10, shown open against spring bias.

In the embodiment shown the bridging element 20 is adapted for coupling conduits of equal diameter through a junction box or similar discontinuity. The internal diameter is rendered constant along the path of the cable, plug or fish. It is also possible to provide a smooth change in diameter for coupling between conduit sections of different diameter. Pneumatic plugs are generally arranged to operate optimally for one diameter of conduit. It is also possible to provide a pneumatic plug which is generally shaped as a collapsible cone or parachute, which can be forced through a change in conduit inner diameter The change in diameter simply is made as a smooth curve defined between mating portions 42, 44, and thus will not obstruct the passage of a fish or pneumatic plug. A fishing apparatus or a pneumatic plug can pass readily from one diameter to the other In FIGS. 1-4, the conduit sections routed to junction box 36 are arranged in line. It may be desired, however, to route a fish or cable from conduit sections which are not in line, e.g., from a lower conduit to an upper one in FIG. 4, or even around a 180 degree reversal of direction. FIGS. 9-11 show that the invention is also applicable to such a situation, by simply arranging the contour of the bridge 20 to follow the desired path. This is normally a simple matter because junction-boxes are generally standardized in their internal dimensions and in the positions of the knock-out plugs where conduit fittings can be received. Therefore, a right angle, S-bend (diagonal passage), direction reversal loop or other arrangement can be formed Preferably, bridging sections according to the invention are provided in a set, including a range of possible routings provided by individual bridging sections, and also including a range of lengths for spanning the openings of junction boxes of different overall size.

FIGS. 10 and 11 demonstrate an example of a routing which is other than co-linear, in this case a right angle bend. In other respects the embodiment of FIGS. 10 and 11 is similar to the embodiment according to FIGS. 1-4, namely wherein two integral sections are coupled at a fulcrum and spring biased to close over the protruding ends of conduit sections affixed to a junction box.

FIGS. 1-3 show the decrease in tube inner diameter leading from the end portion which grasps over the outer wall of the conduit section protruding into the junction box, smoothly into the inner diameter which guides the fishing apparatus into the outgoing conduit. As shown in FIGS. 1-3, finger tabs 68 extend from the pivot point or fulcrum 46, and the spring 52 is arranged to bear inwardly on the tube side of the fulcrum rather than the finger tab side. It is also possible to use a different form of bias to urge the tube sections together. For example, provided the pivot or fulcrum structure permanently affixes the two sections 42, 44 against separation, the spring bias could be provided by a compression spring on the finger tab side of fulcrum 46, biased to push the finger tabs apart In the embodiment shown, however, the two sections 42, 44 are not permanently attached, and instead the inward bias of the spring 52 functions both to hold the sections 42, 44 together and to bias the sections of the tube toward one another. The pivot point, as better seen in FIG. 2, is defined by a rounded protrusion 43 on section 42, which rests in a complementary cavity 45 on the opposed section 44, held together by spring 52 and allowing the two sections 42, 44 to rock on the fulcrum. The interfitting male and female structures on the respective halves of the bridging section can be a rounded post and dish-shaped cavity as shown, or a rounded ridge and valley extending laterally on the inner surface of the finger tabs 68.

The post or ridge on one of the sections and the receptacle in the other of the sections are arranged to allow the sections to pivot over a range sufficient to open the space between the partial tube sections to encompass the protruding ends of the conduits in the junction box or the like, whereby the bridge 20 can be attached over the conduit ends and thereafter removed when the cable or fish line is passing between the ends. The two sections 42, 44 preferably close into a substantially airtight-engagement, defining a smooth inner contour leading from one conduit to the next, and the airtight arrangement can be enhanced by providing a complementary ridge and valley structure (not shown) along the mating edges of sections 42, 44 along line 48.

Figure 8:
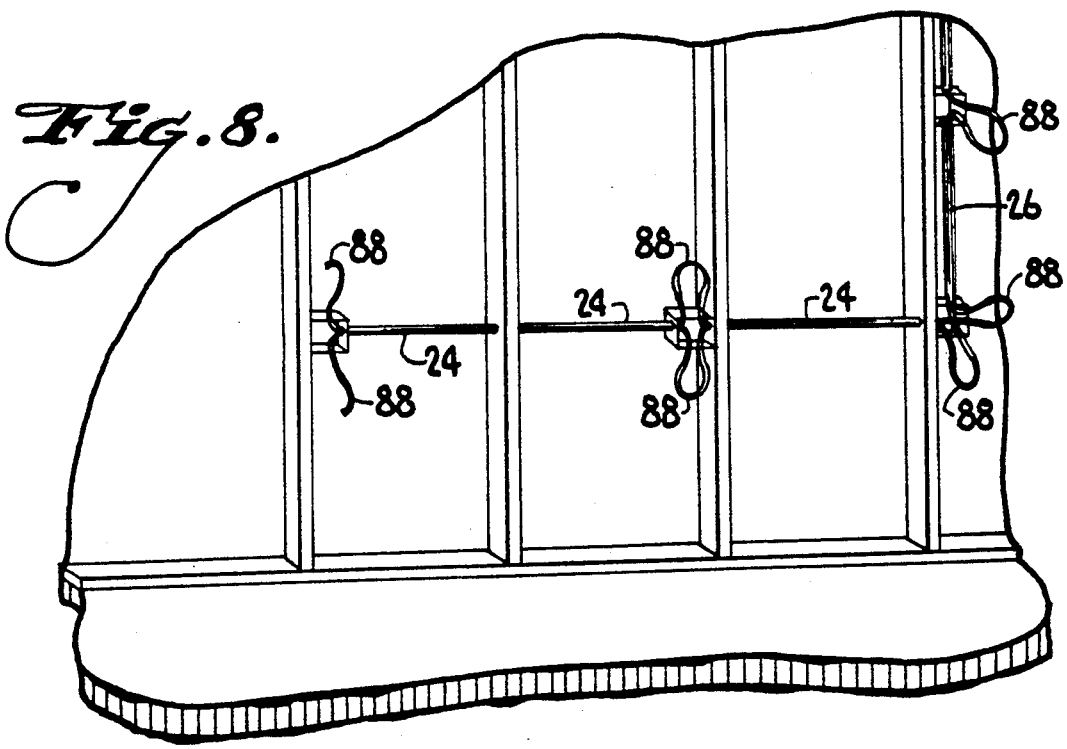
FIG. 8 is a perspective view showing completion of wiring steps.

FIGS. 6-8 illustrate use of the apparatus to accomplish routing of lines without the need to repeatedly visit each junction box. These illustrations refer to a wall mounted path. It will be appreciated that the invention is also applicable to ceiling mounted paths and to other configurations of the conduits.

After the conduits 24, 26 and the junction boxes 36 are mounted to structural fixtures of a building or the like, defining routes for cables, and preferably during the installation of the conduits and boxes, the installer places a bridging section 20 according to the invention in each junction box along at least one continuous path through at least one junction box for a cable path. As mentioned above, the path can be a straight line or an angle. One path can be set up, or several paths can be accomplished successively with one or more of the bridging sections along each path being repositioned or replaced with an angular diversion, U-shape or the like. If any crossovers are to be accomplished, it is also possible to provide a bend in the bridging sections such that two sections can reside at right angles in the same junction box.

When the bridging sections are in place and at least one continuous path is thereby defined, the installer runs a fish or a pneumatic plug along the path, as shown in FIG. 4. This involves placing the fishing apparatus in an insertion end 38 and pushing the apparatus by whatever means to an emerging end 40. In FIG. 4, the fishing apparatus includes a blower 84 for forcing a pneumatic pig or plug along the length of the path to the emerging end 40, carrying along a line 82 as shown.

In the example shown the path traverses a run of conduits and junction boxes, each intermediate junction box being equipped with a bridging section 20. At the emerging end the installer attaches one or more wires or cables 86 to the emerging end of the fish or plug. Upon returning to the insertion end 38, the installer pulls the cable 86 back along the entire path to the fish insertion end, using the fishing line 82. The cables can be fed from spools or other sources at the emerging end. The cables then can be terminated at the fish insertion end 38 of the path, by coupling to other cables, to equipment, etc.

The installer proceeds to the next adjacent junction box 37 in the direction toward the fish emerging end 40 of the path. Whereas the cable was pulled through the path it has no slack in the passage through the junction box, and simply passes linearly through the bridging section 20 in said next junction box 37. It is a simple matter for the installer to remove the bridging section 20 by depressing finger tabs 68 and drawing the bridging section out of the junction box, leaving the cable spanning across the ends of the conduits to which the bridging section was attached.

The installer then pulls a loop of slack in the cable from the cable spool or other source located at the fish emerging end, and makes the required terminations at that junction box. The installer proceeds successively from junction box to junction box, in each case removing the respective bridging section, pulling out slack in the cable from the cable source, and making the necessary terminations. In this manner the entire cable path can be fished and then terminated with only two visits to each junction box location, one for assembling the conduits, junction boxes and bridging sections, and a second to terminate the cables. A substantial savings of time and effort is realized as compared to the conventional procedure of fishing from one junction box to the next for each conduit passage along the cable path.

FIGS. 5 and 9 illustrate an alternative embodiment 220 of the bridging section according to the invention. According to this embodiment the bridging section is defined by a resilient tube which engages over the conduit ends and has a longitudinal seam at which the bridge can be opened. Inasmuch as the tube is resilient it can be bent to shorten the distance between its ends and thereby provided with clearance for fitting the bridge between the protruding ends of the conduits in the junction box, without opening the seam. The bridge 220 is then placed endwise over the protruding ends to define the continuous path. The bridging section can be split along a longitudinal line for mounting on the conduit ends and for passing the bridge over the cable for removal from the junction box.

The resilience of bridging section 220 also enables a crisscross arrangement wherein two bridges 220 are placed in the same junction box at the same time, being simply bent around one another where they cross. The bridge 220 likewise can be bent around an angular diversion as shown in FIG. 9.

FIGS. 10 and 11 illustrate an alternative embodiment wherein bridging section 120 comprises two rigid sections as in FIGS. 1–4. In this case bridge 120 traces a right angle for defining a path as in FIG. 9. FIGS. 9 and 10 use the same reference numerals for elements which are common to the embodiment of FIGS. 1-3, and will not be described again in detail. As shown in FIG. 11, by bringing together finger tabs 68, the tube-defining portions of the integral bridge section elements 42, 44 become separated, for either placing the section over the ends of conduits protruding into a junction box, or for removing the bridge section 120 while leaving a fished line or cable undisturbed.

By use of the invention various possible configurations for cable routes are possible It may be necessary in a particular installation to string cable in a straight line only. Alternatively, angular diversions and crossovers may be needed. Crossing paths and junctions can be planned and executed, in one or more fishing and cable pulling steps. In this manner it is possible, for example, to bring a feeder cable through each conduit in a line, and then to couple two or more terminating cables through the conduit at the feeder cable, for bringing the connections down to two termination points, for example on opposite sides of the junction box positioned laterally of the feeder cable. The invention is directed to a method and apparatus enabling any such variations while reducing the need for the installer to repeatedly visit each junction box along the respective cable routes.

The invention having been disclosed, a number of variations will now become apparent to persons skilled in the art. The invention is meant to encompass not only the preferred exemplary embodiments, but also a reasonable range of equivalents. Reference should be made to the appended claims rather than the foregoing discussion of examples, in order to assess the scope of the invention in which exclusive rights are claimed.

I claim:

1. A method for fishing at least one line through serial hollow conduits having ends terminating in at least one wall of a housing having internal dimensions larger than that of the conduits, such that the housing defines a discontinuity in said internal dimensions at the housing, comprising the steps of:
    attaching to an end of a first conduit and an end of a second conduit a substantially airtight bridging section having an internal contour leading smoothly from the end of said first conduit to the end of said second conduit end, thereby to define a route passing serially through the conduits and through the bridging section therebetween, the bridging section including means which are openable along a full length of the bridging section;
    attaching a plug to an end of said line;
    forcing said plug pneumatically through the route including the bridging section by application of differential pressure to the first and second conduits, whereby said line extends along the route, the bridging section guiding the plug and pneumatically closing the route through the conduits;
    opening the bridging section by operating the means openable along said full length; and,
    removing the bridging section to access said line.

2. The method for fishing at least one line according to claim 1, further comprising the steps of attaching a cable at the end of said line and pulling the cable through the route using the line.

3. The method for fishing at least one line according to claim 1, wherein the conduits are electrical conduits and the housing is one of a junction box and an electrical fixture housing.

4. The method for fishing at least one line according to claim I, wherein a plurality of said housings are disposed along a path between a plurality of said conduits, and further comprising attaching at least one said bridging section to respective ends of conduits terminating at each of the housings along the path to define a route passing serially through each of the conduits and the bridging sections, prior to the fishing step.

5. The method for fishing at least one line according to claim 4, wherein at least one of the junction boxes intersects more than one said path.

6. The method for fishing at least one line according to claim 3, attaching a cable at the end of said line, and pulling the cable through the route using the line, and further comprising pulling a length of slack cable into at least one said junction box after removing a respective one of the bridging sections.

7. The method for fishing at least one line according to claim 1, wherein said conduit ends have stubs protruding into the housing, and said attaching includes affixing bifurcated longitudinal parts of the bridging section to the stubs via spring bias.

* * * * *